(12) United States Patent
Xiao et al.

(10) Patent No.: US 11,113,859 B1
(45) Date of Patent: Sep. 7, 2021

(54) SYSTEM AND METHOD FOR RENDERING THREE DIMENSIONAL FACE MODEL BASED ON AUDIO STREAM AND IMAGE DATA

(71) Applicant: Facebook Technologies, LLC, Menlo Park, CA (US)

(72) Inventors: Tong Xiao, San Jose, CA (US); Sidi Fu, Santa Clara, CA (US); Mengqian Liu, Sunnyvale, CA (US); Peihong Guo, San Mateo, CA (US); Shu Liang, Redwood City, CA (US); Evgeny Zatepyakin, London (GB)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/507,862

(22) Filed: Jul. 10, 2019

(51) Int. Cl.
| | |
|---|---|
| *G06T 13/20* | (2011.01) |
| *G06F 40/44* | (2020.01) |
| *G06T 13/40* | (2011.01) |
| *G06T 15/00* | (2011.01) |
| *G06T 17/20* | (2006.01) |

(52) U.S. Cl.
CPC .......... *G06T 13/205* (2013.01); *G06F 40/44* (2020.01); *G06T 13/40* (2013.01); *G06T 15/005* (2013.01); *G06T 17/205* (2013.01); *G06T 2210/44* (2013.01)

(58) Field of Classification Search
CPC ....... G06T 17/00; G06T 13/205; G06T 13/40; G06T 15/005; G06T 17/205; G06T 2210/44; G06F 40/44
USPC .......................................................... 345/419
See application file for complete search history.

(56) References Cited

U.S. PATENT DOCUMENTS

| | | | |
|---|---|---|---|
| 6,735,566 B1 * | 5/2004 | Brand ................... | G06K 9/6297 345/473 |
| 10,360,716 B1 * | 7/2019 | van der Meulen ..... | G10L 13/08 |
| 10,521,946 B1 * | 12/2019 | Roche ..................... | G10L 21/10 |
| 10,586,369 B1 * | 3/2020 | Roche ................... | G06F 40/279 |
| 10,621,771 B2 * | 4/2020 | Matts ................. | G06Q 30/0282 |
| 10,628,666 B2 * | 4/2020 | Sareen .................... | G06T 19/00 |
| 10,628,729 B2 * | 4/2020 | Sareen ................... | G06N 3/006 |
| 2008/0269958 A1 * | 10/2008 | Filev ..................... | B60W 50/10 701/1 |
| 2013/0257877 A1 * | 10/2013 | Davis ...................... | A63F 13/30 345/473 |
| 2017/0011745 A1 * | 1/2017 | Navaratnam ........ | B25J 11/0015 |
| 2017/0154457 A1 * | 6/2017 | Theobald .............. | G06T 13/205 |
| 2017/0213076 A1 * | 7/2017 | Francisco .......... | G06K 9/00228 |

(Continued)

*Primary Examiner* — David T Welch
(74) *Attorney, Agent, or Firm* — Foley & Lardner LLP

(57) ABSTRACT

Disclosed herein includes a system, a method, and a non-transitory computer readable medium for rendering a three-dimensional (3D) model of an avatar according to an audio stream including a vocal output of a person and image data capturing a face of the person. In one aspect, phonemes of the vocal output are predicted according to the audio stream, and the predicted phonemes of the vocal output are translated into visemes. In one aspect, a plurality of blendshapes and corresponding weights are determined, according to the corresponding image data of the face, to form the 3D model of the avatar of the person. The visemes may be combined with the 3D model of the avatar to form a 3D representation of the avatar, by synchronizing the visemes with the 3D model of the avatar in time.

16 Claims, 9 Drawing Sheets

(56) References Cited

U.S. PATENT DOCUMENTS

2018/0137678 A1\* 5/2018 Kaehler .................. G06T 13/40
2019/0285881 A1\* 9/2019 Ilic ......................... G06T 13/40

\* cited by examiner

SYSTEM AND METHOD FOR RENDERING THREE DIMENSIONAL FACE MODEL BASED ON AUDIO STREAM AND IMAGE DATA

FIELD OF DISCLOSURE

The present disclosure is generally related to rendering a representation of an avatar, including but not limited to rendering the representation of the avatar according to an audio stream and image data.

BACKGROUND

Proliferation of artificial reality experiences (e.g., augmented reality (AR), virtual reality (VR), or mixed reality (MR)) allows communication through a new form. In one application, an avatar or a virtual representation of a real person can represent the person's movement or expression in artificial reality applications such as video games, virtual conferences, etc. For example, an avatar in a VR environment can be configured to smile to express happiness or frown to express discontent.

SUMMARY

Various embodiments disclosed herein are related to a method for rendering a representation of an avatar according to an audio stream including a vocal output of a person and image data capturing a face of the person. In some embodiments, the audio stream and the image data are obtained, e.g., via a recording of the vocal output or from storage. In some embodiments, phonemes of the vocal output are predicted according to the audio stream. In some embodiments, the predicted phonemes of the vocal output are translated into visemes. In some embodiments, a plurality of blendshapes and corresponding weights are determined, according to the corresponding image data of the face, to form a three dimensional (3D) model of the avatar of the person. In some embodiments, the visemes are combined with the 3D model of the avatar to form the representation of the avatar, by synchronizing the visemes with the 3D model of the avatar in time.

In some embodiments, the phonemes of the vocal output are predicted by determining probabilities of the phonemes of the vocal output according to the audio stream. In some embodiments, the plurality of blendshapes and corresponding weights are determined according to a facial action coding system. In some embodiments, the corresponding weights are determined by determining a base set of landmarks of the face from the corresponding image data of the face, and a first set of weights. In some embodiments, the corresponding weights are determined by determining a first candidate set of landmarks using a 3D model of the face formed according to the first set of weights and comparing the base set of landmarks and the first candidate set of landmarks. In some embodiments, the corresponding weights are determined by determining a second set of weights that results in a second candidate set of landmarks, where a difference between the second candidate set of landmarks and the base set of landmarks is less than a difference between the first candidate set of landmarks and the base set of landmarks. In some embodiments, the second set of weights may be applied as or determined to be the corresponding weights. Such a process may not be limited to two iterations (e.g., to determine two sets of weights), and can proceed iteratively to achieve smaller differences between candidate sets of landmarks and the base set of landmarks. For instance, in some embodiments, an additional set of weights, which results in an additional candidate set of landmarks having a smaller difference from the base set of landmarks than the difference between the second candidate set of landmarks and the base set of landmarks, can be determined and applied as or determined to be the corresponding weights.

In some embodiments, the 3D model of the avatar is generated by combining the plurality of blendshapes according to the corresponding weights. In some embodiments, combining the visemes with the 3D model of the avatar includes morphing or replacing at least a portion of a mouth of the 3D model corresponding to a first time instance, according to one of the visemes corresponding to the first time instance.

In some embodiments, the vocal output of the person is received through a microphone over a plurality of time instances, as the audio stream. In some embodiments, images of the face of the person over the plurality of time instances are acquired through an imaging device as the corresponding image data. In some embodiments, the 3D representation of the avatar is rendered in synchronization with rendering of the audio stream.

Various embodiments disclosed herein are related to a system for rendering a representation of an avatar according to an audio stream including a vocal output of a person and image data capturing a face of the person. In some embodiments, the one or more processors are configured to obtain the audio stream and the image data. In some embodiments, the one or more processors are configured to predict phonemes of the vocal output according to the audio stream. In some embodiments, the one or more processors are configured to translate the predicted phonemes of the vocal output into visemes. In some embodiments, the one or more processors are configured to determine a plurality of blendshapes and corresponding weights, according to the corresponding image data of the face, to form a three-dimensional (3D) model of an avatar of the person. In some embodiments, the one or more processors are configured to combine the visemes with the 3D model of the avatar to form the representation of the avatar, by synchronizing the visemes with the 3D model of the avatar in time.

In some embodiments, the one or more processors are configured to predict the phonemes of the vocal output by determining probabilities of the phonemes of the vocal output according to the audio stream. In some embodiments, the one or more processors are further configured to determine the plurality of blendshapes and corresponding weights according to a facial action coding system.

In some embodiments, the one or more processors are configured to determine the corresponding weights by determining a base set of landmarks of the face from the corresponding image data of the face, and determining a first set of weights. In some embodiments, the one or more processors are configured to determine the corresponding weights by determining a first candidate set of landmarks using a 3D model of the face formed according to the first set of weights. In some embodiments, the one or more processors are configured to determine the corresponding weights by comparing the base set of landmarks and the first candidate set of landmarks. In some embodiments, the one or more processors are configured to determine the corresponding weights by determining a second set of weights that results in a second candidate set of landmarks, where a difference between the second candidate set of landmarks and the base set of landmarks is less than a difference between the first candidate set of landmarks and the base set of landmarks.

In some embodiments, the one or more processors are configured to generate the 3D model of the avatar by combining the plurality of blendshapes according to the corresponding weights. In some embodiments, the one or more processors are configured to combine the visemes with the 3D model of the avatar by morphing or replacing at least a portion of a mouth of the 3D model corresponding to a first time instance, according to one of the visemes corresponding to the first time instance.

In some embodiments, the one or more processors are configured to receive, through a microphone, the vocal output of the person over a plurality of time instances, as the audio stream. In some embodiments, the one or more processors are configured to acquire, through an imaging device, images of the face of the person over the plurality of time instances, as the corresponding image data. In some embodiments, the one or more processors are configured to render the 3D representation of the avatar in synchronization with rendering of the audio stream.

Various embodiments disclosed herein are related to a non-transitory computer readable medium for rendering a representation of an avatar according to an audio stream including a vocal output of a person and image data capturing a face of the person. In some embodiments, the non-transitory computer readable medium stores instructions when executed by the one or more processors cause the one or more processors to obtain the audio stream and the image data. In some embodiments, the instructions when executed by the one or more processors cause the one or more processors to predict phonemes of the vocal output according to the audio stream. In some embodiments, the instructions when executed by the one or more processors cause the one or more processors to translate the predicted phonemes of the vocal output into visemes. In some embodiments, the instructions when executed by the one or more processors cause the one or more processors to determine a plurality of blendshapes and corresponding weights, according to the corresponding image data of the face, to form a three-dimensional (3D) model of an avatar of the person. In some embodiments, the instructions when executed by the one or more processors cause the one or more processors to combine the visemes with the 3D model of the avatar to form the representation of the avatar, by synchronizing the visemes with the 3D model of the avatar in time.

In some embodiments, the instructions that cause the one or more processors to predict the phonemes of the vocal output further comprise instructions when executed by the one or more processors cause the one or more processors to determine probabilities of the phonemes of the vocal output according to the audio stream. In some embodiments, the non-transitory computer readable medium further includes instructions when executed by the one or more processors cause the one or more processors to determine the plurality of blendshapes and corresponding weights according to a facial action coding system.

In some embodiments, the instructions that cause the one or more processors to determine the corresponding weights further comprise instructions when executed by the one or more processors cause the one or more processors to determine a base set of landmarks of the face from the corresponding image data of the face and determine a first set of weights. In some embodiments, the instructions that cause the one or more processors to determine the corresponding weights further comprise instructions when executed by the one or more processors cause the one or more processors to determine a first candidate set of landmarks using a 3D model of the face formed according to the first set of weights and compare the base set of landmarks and the first candidate set of landmarks. In some embodiments, the instructions that cause the one or more processors to determine the corresponding weights further comprise instructions when executed by the one or more processors cause the one or more processors to determine a second set of weights that results in a second candidate set of landmarks, where a difference between the second candidate set of landmarks and the base set of landmarks is less than a difference between the first candidate set of landmarks and the base set of landmarks.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
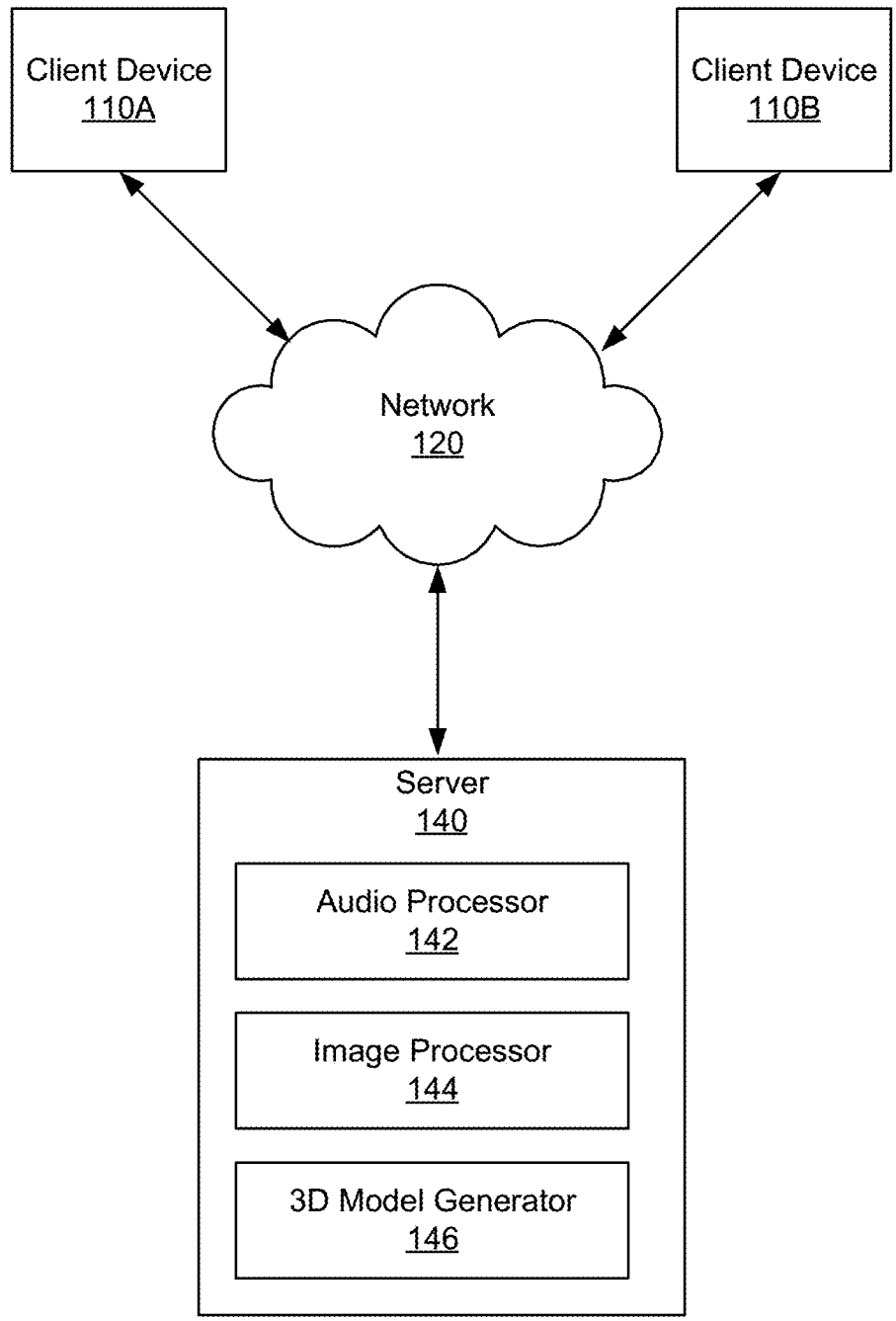
FIG. 1 is a block diagram of an environment for generating a 3D face model according to an audio stream and image data, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein include embodiments of a system, a method, and a non-transitory computer readable medium for generating a three-dimensional (3D) model of an avatar according to an audio stream including a vocal output of a person and image data capturing a face of the person. The system may predict phonemes of the vocal output according to the audio stream. A phoneme can include, correspond to, or be indicative of a perceptually distinct unit of sound in a particular language that distinguishes one word (or a partial word) from another. The system may convert the predicted phonemes of the vocal output into visemes. A viseme can include, correspond to, or be indicative of a model or data indicating a mouth shape (e.g., shape and structure of a mouth and surrounding features, which can include at least a part of corresponding lips, cheeks, jaw and/or chin) associated with a particular sound or a phoneme. The system may determine a plurality of blendshapes with corresponding weights, according to the corresponding image data of the face of the person, to form the 3D model of the avatar. A blendshape can include, describe, correspond to, or be indicative of a structure, shape and/or profile of at least a portion or component of a body (e.g., a face, or a portion thereof), of an avatar for instance. The system may combine the visemes with the 3D model of the avatar to form a 3D representation of the avatar, by synchronizing the visemes with the 3D model of the avatar in time (e.g., at various instances in time, and in time synchronization with the corresponding audio stream when rendered together with the 3D representation). The synchronization between the visemes and the 3D model may also be with respect to the corresponding orientation and/or movement of the head or body of the avatar at various time instances, in forming the 3D representation of the avatar.

In one approach, visemes can be determined from an audio stream capturing a vocal output of a person, and the 3D model of the avatar with facial movements (e.g., movements of lips, cheeks, chin and/or nose) can be generated according to the visemes. However, generating a 3D model or representation of the avatar based on the visemes alone may not reflect complex facial expressions of other parts (e.g., eyebrow, eyes) of the face. In one approach, landmarks of a person's face can be determined from an image capturing the face. Landmarks can include, correspond to, or be indicative of data indicating locations or shapes (e.g., contortions, compression, stretching, shifting) of different body parts (e.g., lips, eyes, nose, eyebrows, etc.). However, applying the determined landmarks to a 3D model of the avatar may not be feasible or may involve a complex process, because the avatar may have a different (e.g., stylized) shape than the shape of the person's face. For example, although a person raises his eyebrow by 5 mm, it may not be feasible or appropriate to raise an eyebrow of an avatar (e.g., by the same amount of 5 mm). Moreover, determining the landmarks of the person's face for every frame may be computationally exhaustive.

Advantageously, the disclosed system and method allow generating the 3D model or representation of the avatar with realistic expressions and/or facial movements in sync (or in synchronization) with the vocal output of the person to provide improved artificial reality experiences. For example, by extracting landmarks of the face in the image data, complex expressions of different face parts of the person can be determined and applied to the 3D model of the avatar. For another example, by determining visemes according to the vocal output in the audio stream, detailed facial shapes and/or movements at and around the mouth (e.g., that of lips or nose) can be determined, and applied to (e.g., supplemented, incorporated or replaced into) the 3D model of the avatar to enhance or augment the detail and realism of the avatar. Accordingly, the avatar of the person having varying (enhanced or augmented) facial movements or expressions in sync with the vocal output of the person can be rendered, for example, in artificial reality applications (e.g., video games or virtual conferences) in real time or near real time.

Referring to FIG. 1, illustrated is a block diagram of an environment 100 for generating a 3D face model according to an audio stream and image data, according to an example implementation of the present disclosure. In some embodiments, the environment 100 includes one or more client devices 110A . . . 110B (generally referred to as "a client device 110") and a server 140 communicating with each other through a network 120. These components may operate together to capture facial expressions and vocal outputs of a person (or a user) operating a client device 110A (e.g., a head mounted display unit), and generate a 3D model of the avatar with realistic expressions and facial movements according to the captured facial expressions and vocal outputs of the person. A representation of the 3D model of the avatar in artificial reality experience (e.g. video game or virtual conference) may be rendered by another client device 110B (e.g., by another head mounted display unit, to another person). In some embodiments, the environment 100 includes more, fewer, or different components than shown in FIG. 1. For example, the server 140 may be implemented as part of the client device 110A or the client device 110B.

The client device 110 can include or correspond to a computing device that allows a user or a person operating the client device 110 to experience or interface an artificial reality (e.g., VR, AR, or MR). In some embodiments, the client device 110 is implemented as a personal computer, a portable laptop, a tablet computer, a smartphone, etc. In one aspect, the client device 110 includes or is coupled to a microphone, through which the client device 110 can capture a vocal output of a user experiencing the artificial reality, and generate an audio stream (or an audio signal) representing the captured vocal output. In another aspect, the client device 110 includes or is coupled to an imaging device, through which the client device 110 can capture a face (or face parts) of the person and, and generate image data representing the captured face. The client device 110 may transmit the audio stream and the image data to the server 140 through the network 120.

The server 140 can include or correspond to a computing device that generates a 3D model of an avatar associated with a person, according to an audio stream and image data. In some embodiments, the server 140 includes an audio processor 142, an image processor 144, and a 3D model generator 146. These components may operate together to receive the audio stream capturing vocal output of the person and image data capturing face images of the person, and generate a 3D model of an avatar associated with the person with facial expressions and facial movements according to the captured vocal output and face images.

In some embodiments, the components of the server 140 may be embodied as hardware, software, firmware, or any combination thereof. In some embodiments, these components may be implemented as a software module executable on a processor of the server 140 with a non-transitory computer readable medium storing instructions that when executed by the processor cause the processor to perform various operations disclosed herein. In some embodiments, these components may be implemented as a hardware module on a field programmable gate logic (FPGA) and/or an application-specific integrated circuit (ASIC). In some embodiments, the server 140 includes more, fewer, or different components than shown in FIG. 1. For example, some or all components of the server 140 may be implemented by any client device 110 or distributed among different client devices 110.

The audio processor 142 can include or correspond to a component that determines or generates visemes according to an audio stream. In some embodiments, the audio processor 142 obtains, extracts, predicts or determines phonemes from the audio stream. A phoneme can include, correspond to, or be indicative of a perceptually distinct unit of sound in a particular language that distinguishes one word (or a portion thereof) from another. As an example, there are 44 phonemes associated with the English language; other languages such as the Spanish language is associated with 24 phonemes. The audio processor 142 may analyze spectral or frequency components of the audio stream to detect energy in a particular frequency band or a sequence of change in the energy in different frequency bands, and predict, identify, detect and/or determine phonemes corresponding to the detected energy or the detected sequence of change in the energy in different frequency bands. For example, the audio processor 142 may determine a probability of each of one or more phonemes corresponding to a portion of the audio stream, and can predict or detect one of the one or more phonemes according to the probabilities (e.g., by selecting the phoneme with the highest probability). The audio processor 142 may translate or map the phonemes into corresponding visemes. A viseme can include, correspond to, or be indicative of a model or data indicating a mouth shape (e.g., structure, profile and/or expression) associated with a particular sound or a phoneme. The audio processor 142 may refer to predetermined mapping information indicating associations between different phonemes and visemes, to translate or map the predicted or detected phonemes into corresponding visemes. Detailed implementation and operation of the audio processor 142 are provided below with respect to FIG. 2.

The image processor 144 is a component that determines, identifies, selects and/or generates blendshapes of an avatar, according to image data. A blendshape can include, correspond to, or be indicative of a structure, shape and/or profile of a face part (e.g., eye, nose, eyebrow, lips, etc.) of an avatar for instance, where a corresponding weight may indicate an amount of change, emphasis, transformation or shift applied to the face part. For example, blendshapes with a set of corresponding weights can indicate to raise a right eyebrow by 5 mm, and apply wrinkles to a nose by 30%, fully open both eyes and open a mouth by 80%. In some embodiments, the blendshapes are represented in or conform to Facial Action Coding System (FACS), or other predefined or custom classification system. In one approach, the image processor 144 obtains, detects, determines, or extracts landmarks of a face of the person in the image data. Landmarks can include, correspond to, or be indicative of data indicating locations or shapes of different body parts (e.g., lips, eyes, nose, eyebrows, etc.), for example, in two dimensions (2D). According to the detected landmarks, the image processor 144 may determine a specific plurality or combination of blendshapes. For example, the image processor 144 may iteratively determine or generate a candidate set of blendshapes that renders or results in landmarks closest to the detected landmarks from the image data. Detailed implementation and operation of the image processor 144 are provided below with respect to FIG. 3.

The 3D model generator 146 includes or corresponds to a component that generates a 3D model of an avatar according to (e.g., using, or by combining) the visemes from the audio processor 142 and the blendshapes from the image processor 144. The 3D model may be a virtual 3D mesh indicating shapes and movements of the face parts of the avatar to manifest expressions. In one aspect, the 3D model generator 146 generates or constructs the 3D model of the avatar such that face parts (e.g., lips, eye brows, eyes, nose, etc.) of the 3D model are formed or shaped as indicated by the blendshapes (and their corresponding weights). The 3D model generator 146 may also combine or integrate the visemes with the 3D model of the avatar to form a 3D representation of the avatar, by synchronizing the visemes with the 3D model of the avatar in time (e.g., over various time instances associated with both the visemes and the 3D model). For example, lips or a nose may be deformed (according to a viseme overlaying or modifying a mouth region of the 3D model) such that the resulting 3D model of the avatar appears to produce a vocal output in sync. In one aspect, the audio stream and the image data may be timestamped. The 3D model generator 146 may generate the 3D model of the avatar for the image data for various timestamps (e.g., corresponding to the timestamps of the audio stream and/or the image data) and transform or modify a portion (e.g., lips or nose) of the 3D model according to the visemes of the audio stream with the same or close (e.g., ±500 ms) timestamp. In one aspect, the 3D model generator 146 may combine the visemes with the 3D model of the avatar and render a representation or an image of the combined 3D model in real time or near real time (e.g., less than 50 ms, 100 ms or 200 ms time lag) with respect to obtaining the audio stream and the image data.

Figure 2:
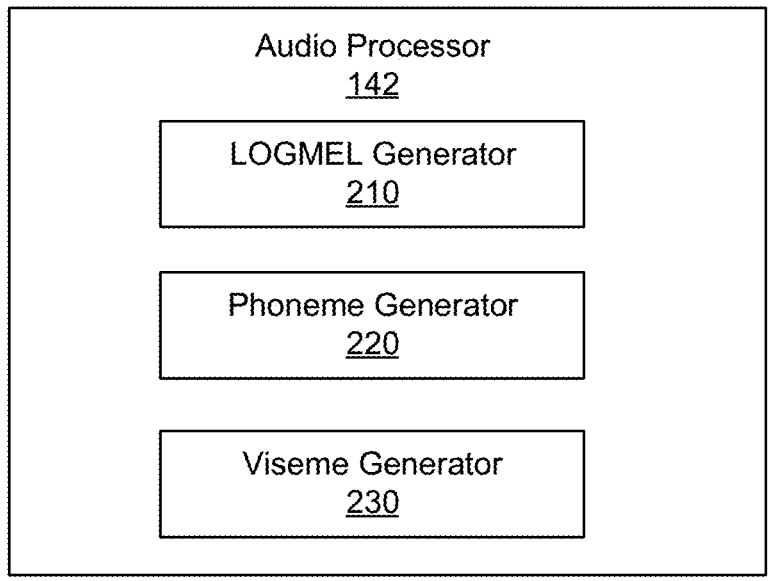
FIG. 2 is a block diagram of an audio processor of FIG. 1, according to an example implementation of the present disclosure.

Referring to FIG. 2, illustrated is a block diagram of an audio processor 142 of FIG. 1, according to an example implementation of the present disclosure. In some embodiments, the audio processor 142 includes a LOGMEL (logarithmic MEL) generator 210, a phoneme generator 220, and/or a viseme generator 230. These components may operate together to receive an audio stream including or indicating a vocal output of a person, and determine phonemes from the audio stream. In some embodiments, the audio processor 142 includes more, fewer, or different components than shown in FIG. 2.

The LOGMEL generator 210 is a component that generates, obtains, or determines LOGMEL features from the audio stream. A LOGMEL feature can include, correspond to, or be indicative of a representation, for example, in amplitude, frequency band, of a vocal output. The LOGMEL generator 210 may perform Fourier transformation (or other transformation, such as wavelet transformation) on the audio stream (or audio signal) indicating vocal output in a time domain. The LOGMEL generator 210 may identify, from the output of the Fourier transformation, at least one LOGMEL feature in the vocal output or audio stream. For instance, the LOGMEL generator may identify or detect a frequency band having energy over a predetermined threshold, or identify changes or shifts in frequency bands having energy over the predetermined threshold. For example, the LOGMEL generator 210 may determine or identify that energy of the vocal output in the audio stream is concentrated between 30-50 Hz. For another example, the LOGMEL generator 210 may determine, detect or identify that peak energy of the vocal output in the audio stream shifts 30 Hz to 150 Hz over a time with gradually increasing amplitude, as a LOGMEL feature.

The phoneme generator 220 can include or correspond to a component that predicts or determines one or more phonemes according to the LOGMEL feature. In one approach, the phoneme generator 220 maps at least one LOGMEL feature from the LOGMEL generator 210 into a corresponding phoneme according to mapping information indicating association between one or more LOGMEL features and corresponding one or more phonemes. In another approach, the phoneme generator 220 determines probabilities of possible or candidate phonemes of the vocal output according to the audio stream. The phoneme generator 220 may train a neural network according to different LOGMEL features with corresponding phonemes as corresponding target outputs. For example, the phoneme generator 220 may set, adjust, or modify weights or coefficients of the neural network such that a phoneme predicted by the neural network according to a LOGMEL feature can match or be close to (e.g., within a proximity distance from) the target output. After the training, the phoneme generator 220 may apply the LOGMEL feature from the LOGMEL generator 210 as an input to the neural network to obtain a predicted phoneme as an output or a detected phoneme.

The viseme generator 230 can include or correspond to a component that generates or determines visemes associated with the phonemes. In one approach, the viseme generator 230 may translate or map the phonemes into corresponding visemes. The viseme generator 230 may refer to mapping information indicating associations between different phonemes and visemes, to translate or map the predicted phonemes into corresponding visemes. For example, for a phoneme "Ah", the viseme generator 230 generates or obtains a viseme indicating wide opened lips. For another example, for a phoneme "B," "M," or "P", the viseme generator 230 generates or obtains a sequence of visemes indicating movements from lips from being closed to being opened.

Figure 3:
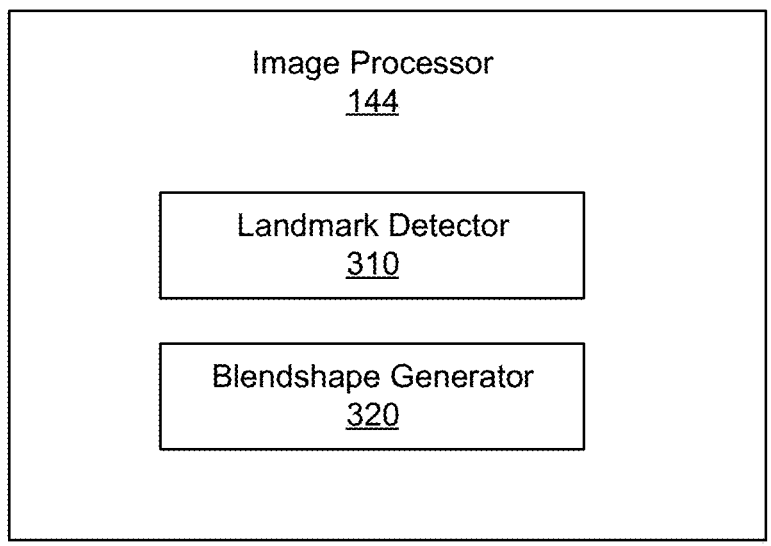
FIG. 3 is a block diagram of an image processor of FIG. 1, according to an example implementation of the present disclosure.

Referring to FIG. 3, illustrated is a block diagram of an image processor 144 of FIG. 1, according to an example implementation of the present disclosure. In some embodiments, the image processor 144 includes a landmark detector 310 and a blendshape generator 320. These components may operate together to receive image data including or indicating a face part of a person, and determine or generate blendshapes (e.g., with corresponding weights) of an avatar. In other embodiments, the image processor 144 includes more, fewer, or different components than shown in FIG. 3.

The landmark detector 310 is a component that receives an image data of a face image, and determines or extracts landmarks of the face image. A landmark can refer to a point along or on an outline, edge, demarcation or boundary of a facial feature (e.g., along an outer lip, or nose ridge, or on an outline of an eye). In one approach, the landmark detector 310 implements or includes a neural network with a cascade of regression trees. A cascade of regression trees may have multiple levels and multiple regression trees for each level. A first level of the cascade may generate or predict a 2D adjusted mesh model of a face based on a captured image and a 2D default mesh model of the face. A mesh model may include a plurality of triangles or tetrahedrons (or other shapes), where a landmark can be represented by a linear combination of vertices of associated triangles or tetrahedrons. For example, the default mesh model can be adjusted such that the adjusted mesh model becomes closer to contours of face parts in the captured image. Each of following levels of the cascade may predict an adjusted mesh model based on a mesh model of a previous level and the captured face image, such that an error between the adjusted mesh model and contours of the face parts can be reduced. The landmark detector 310 may determine vertices of triangles (or tetrahedrons or other shapes) or linear combinations of vertices of triangles (or tetrahedrons or other shapes) as 2D landmarks of the face image.

The blendshape generator 320 can include or correspond to a component that determines blendshapes with corresponding weights for the landmarks. In some embodiments, the blendshapes are represented in or conform to Facial Action Coding System (FACS) or another standard or custom facial coding system. In one aspect, the blendshape generator 320 morphs a 3D mesh model to fit the detected 2D landmarks. The blendshape generator 320 can generate, form or estimate a 3D mesh model of the face according to the detected 2D landmarks. For example, the blendshape generator 320 determines a candidate set of blendshapes with corresponding weights. For example, the candidate set of blendshapes indicates to raise a right eyebrow by 5 mm, and apply wrinkles to a nose by 30%, fully open both eyes and open a mouth by 80% (e.g., according to the corresponding weights). The blendshape generator 320 may mix n expression models (e.g., blendshapes) with a neutral face model to represent a range of complex facial movements as below:

$$B = B_0 + \sum_{i=1}^{n} W_i \times (B_i - B_0)$$

where $B_0$ is the neutral face model, $B_i$ is the ith expression model (basis), $W_i$ is the weight of the ith expression, and B is a combination of different facial movements or expressions. The blendshape generator 320 may generate a 3D mesh model with face parts emphasized and/or modified as indicated by the blendshapes B, then convert or back project the 3D mesh model to a 2D model. The blendshape generator 320 may compare the back projected 2D model with the 2D landmarks. The blendshape generator 320 may repeat the process for a different candidate set of blendshapes. The blendshape generator 320 may determine from a plurality candidate sets of blendshapes, a set of blendshapes rendering or resulting in a 3D mesh model with a back projected 2D model that is closest to the 2D landmarks.

According to the blendshapes, a 3D model of an avatar can be generated. In one aspect, landmarks of a person's face are not directly applicable or transferable to a 3D model of an avatar (e.g., a highly stylized avatar), because shapes or relative dimensions of face parts of the person may be different from shapes or relative dimensions of face parts of the avatar. By determining blendshapes indicating facial movements or expressions of a real person, a 3D model of an avatar can be generated to reflect facial movements or expression of the real person by morphing or transforming a default 3D model of the avatar according to the determined blendshapes.

Figure 4:
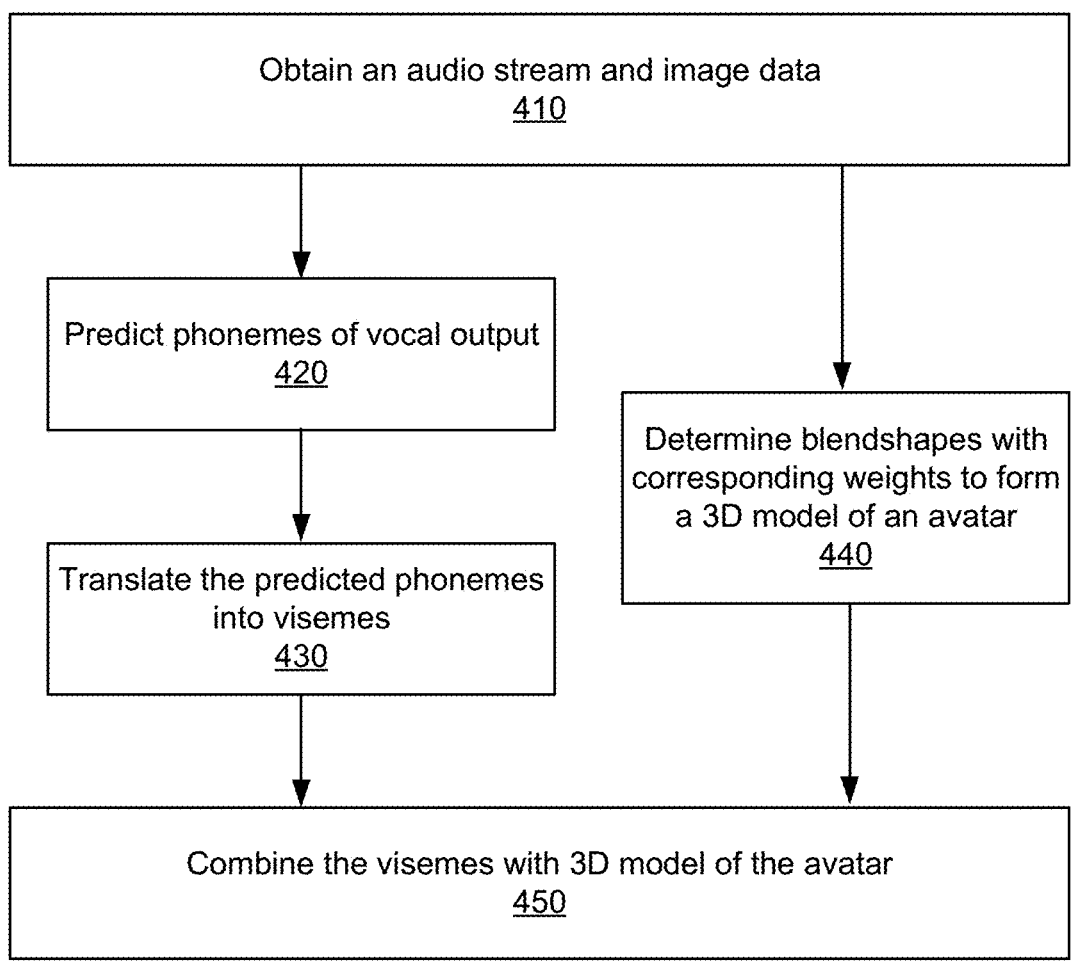
FIG. 4 is a flow chart illustrating a process of generating a 3D face model according to an audio stream and image data, according to an example implementation of the present disclosure.

FIG. 4 is a flow chart illustrating a process 400 of generating a 3D face model according to an audio stream and image data, according to an example implementation of the present disclosure. In some embodiments, the process 400 is performed by a system (e.g., client device 110 and/or the server 140 of FIG. 1). In some embodiments, the process 400 includes more, fewer, or different steps than shown in FIG. 4.

In one approach, the system can obtain 410 an audio stream and image data. The audio stream may include or capture a vocal output of a person (e.g., over a time window or at various time instances). The image data may include or capture a face image of the person (e.g., over the same time window or at the same various time instances). The system may receive the audio stream from another device, or obtain the audio stream through a microphone embedded in the system.

In one approach, the system predicts 420 phonemes of vocal output from the audio stream. A phoneme can include, correspond to, or be indicative of a perceptually distinct unit of sound in a particular language that distinguishes one word from another. The system may analyze spectral components of the audio stream to detect energy in a particular frequency band or a sequence of change in the energy in different frequency bands, and predict or determine phonemes corresponding to the detected energy or the detected sequence of change in the energy in different frequency bands.

In one approach, the system translates 430 the predicted phonemes into visemes. A viseme can include, correspond to, or be indicative of a model or data indicating a mouth shape associated with a particular sound or a phoneme. The system may refer to mapping information indicating associations between different phonemes and visemes, and can translate or map the predicted phonemes into corresponding visemes according to the mapping information.

In one approach, the system determines 440 blendshapes with corresponding weights to form a 3D model of an avatar. A blendshape can include, correspond to, or be indicative of a structure, shape and/or profile of a face part (e.g., eye, nose, eyebrow, lips, etc.) of an avatar for instance, where a corresponding weight may indicate an amount of emphasis (e.g., on the structure, shape and/or profile of a face part), change, transformation or shift applied to the face part. For example, blendshapes with a set of corresponding weights can indicate to raise a right eyebrow by 5 mm, and apply wrinkles to a nose by 30%, fully open both eyes and open a mouth by 80%. In some embodiments, the blendshapes are represented in or conform to Facial Action Coding System (FACS), or another standard or custom facial coding system. The system may obtain, detect, determine, or extract landmarks of a face of the person in the image data. Landmarks can include, correspond to, or be indicative of data indicating locations or shapes (e.g., outlines, boundaries, edges, characteristic or distinct features) of different body parts (e.g., lips, eyes, nose, eyebrows, etc.), for example, in two dimensions (2D). According to the detected landmarks, the system may determine, identify and/or select a number or blendshapes. For example, the system may iteratively determine or generate a candidate set of blendshapes that renders or results in landmarks with reduced errors from the detected landmarks of the image data. In some embodiments, the step 440 can be performed in parallel with at least one of the steps 420, 430. In some embodiments, the step 440 can be performed after one or both of the steps 420, 430, or before one or both of the steps 420, 430.

In one approach, the system combines 450 the visemes with the 3D model of the avatar. The 3D model may be a virtual 3D mesh indicating shapes and movements of the face parts of the avatar to manifest expressions. In one embodiment, the system generates or constructs the 3D model of the avatar such that face parts (e.g., lips, eye brows, eyes, nose, etc.) of the 3D model are formed or shaped as indicated by the blendshapes. The system may also combine the visemes with the 3D model of the avatar to form a 3D representation (e.g., images) of the avatar, by synchronizing the visemes with the 3D model of the avatar in time (e.g., at various consecutive time instances during a window of time). For example, lips or a nose may be deformed such that the 3D model of the avatar appears to produce a vocal output in sync. In one aspect, the audio stream and the image data may be timestamped (or otherwise tagged for synchronization purposes). The system may generate the 3D model of the avatar for the image data, and transform, replace, blend and/or modify a portion (e.g., lips or nose) of the 3D model according to (or using) the visemes of the audio stream with the same or approximate (e.g., ±500 ms) timestamp. In one aspect, the system may combine or integrate the visemes with the 3D model of the avatar and render or display a representation or images of the combined 3D model in real time or near real time with respect to obtaining the audio stream and the image data.

Figure 5:
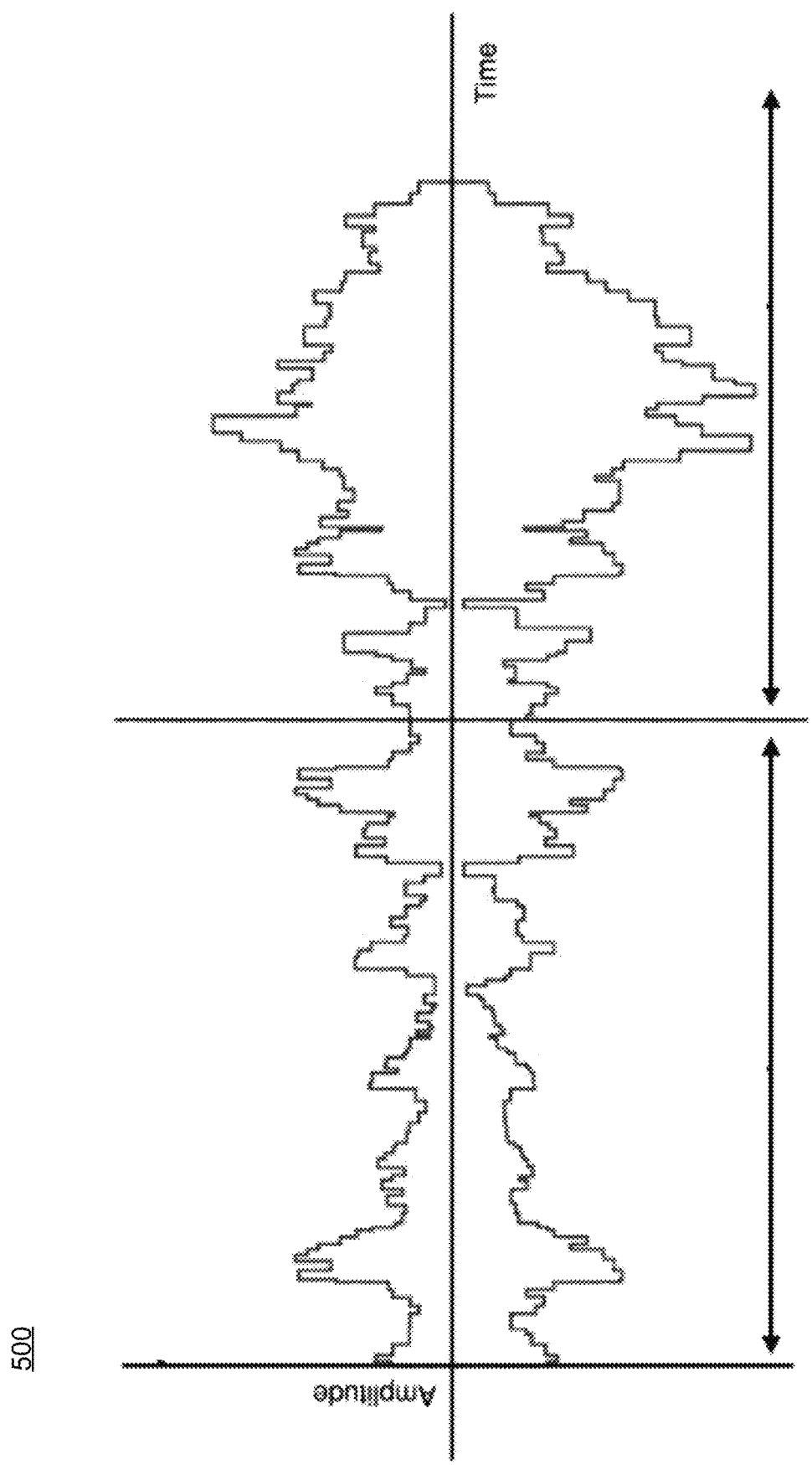
FIG. 5 is a plot showing an example audio signal, according to an example implementation of the present disclosure.
Figures 6A, 6B, 6C, 6D, 6E:
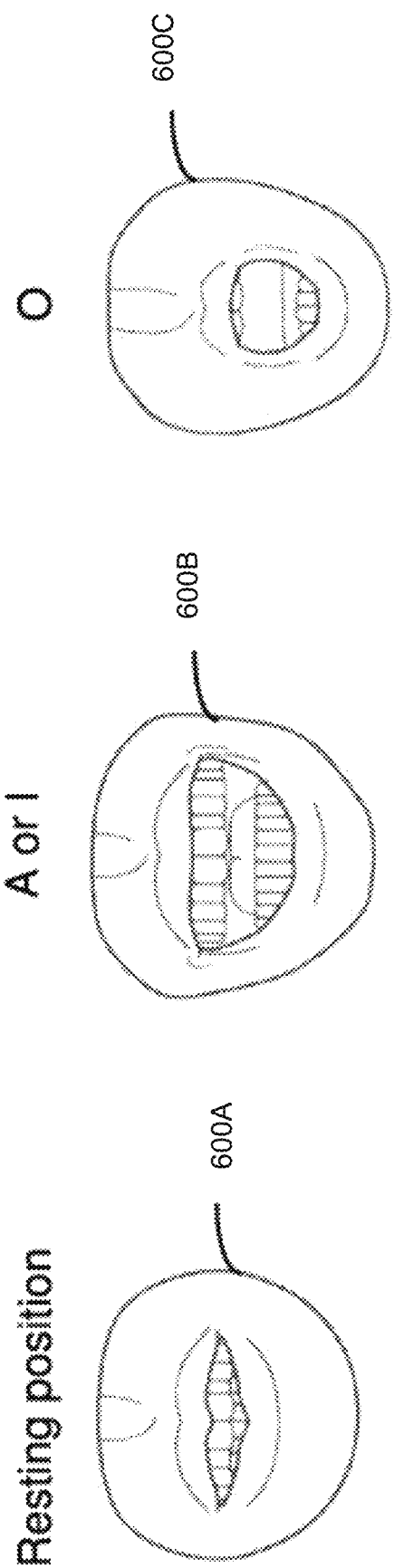
FIGS. 6A-6E show different visemes associated with corresponding phonemes, according to an example implementation of the present disclosure.

Referring to FIG. 5, illustrated is a plot showing an example audio signal 500, according to an example implementation of the present disclosure. In one aspect, the audio signal 500 represents a vocal output of a person with varying amplitude over time. In one illustrative approach, Fourier transformation may be applied to the audio signal 500 to identify LOGMEL features or characteristics of the vocal output in a frequency domain. For example, a frequency band having energy over a predetermined threshold may be identified, or changes or shifts in frequency bands having energy over the predetermined threshold may be identified. According to the LOGMEL features or characteristics of the vocal output in the frequency domain, corresponding phonemes may be predicted or detected.

Referring to FIGS. 6A-6E, illustrated are different visemes 600A-600E associated with corresponding phonemes, according to an example implementation of the present disclosure. For example, viseme 600A corresponds to a resting position. For another example, viseme 600B corresponds to a phoneme "A" or "I". For another example, viseme 600C corresponds to a phoneme "O". For another example, viseme 600D corresponds to a phoneme "E". For another example, viseme 600E corresponds to a phoneme "U". The audio processor 142 of FIG. 1 may store mapping information indicating associations between different phonemes and visemes, and can apply the mapping information to translate or map the predicted phonemes into corresponding visemes. In some embodiments, more or different visemes than that shown in FIGS. 6A-6E may be stored and utilized by the audio processor 142.

Figure 7:
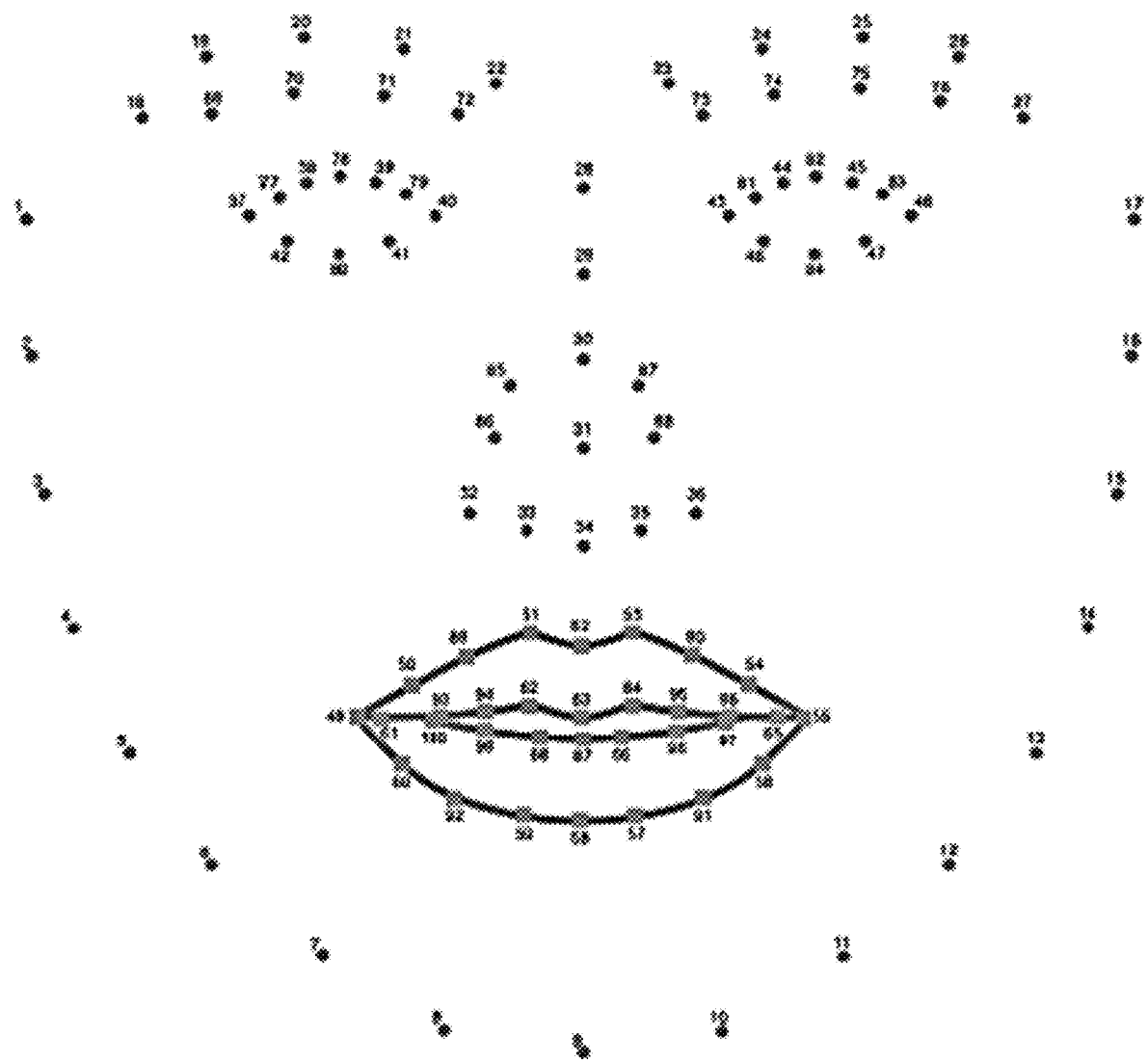
FIG. 7 shows example landmarks, according to an example implementation of the present disclosure.

Referring to FIG. 7, illustrated are example landmarks 700 (e.g., on a 2D image of a face), according to an example implementation of the present disclosure. In some embodiments, the landmarks 700 indicate locations, contours, edges, boundaries, outlines or shapes of different body parts (e.g., lips, eyes, nose, eyebrows, etc.). In one approach, the landmarks of face parts in image data can be identified and/or generated, and the landmarks can be applied to determine blendshapes with corresponding weights as described above with respect to FIGS. 1, 3 and 4 for example.

Figure 8:
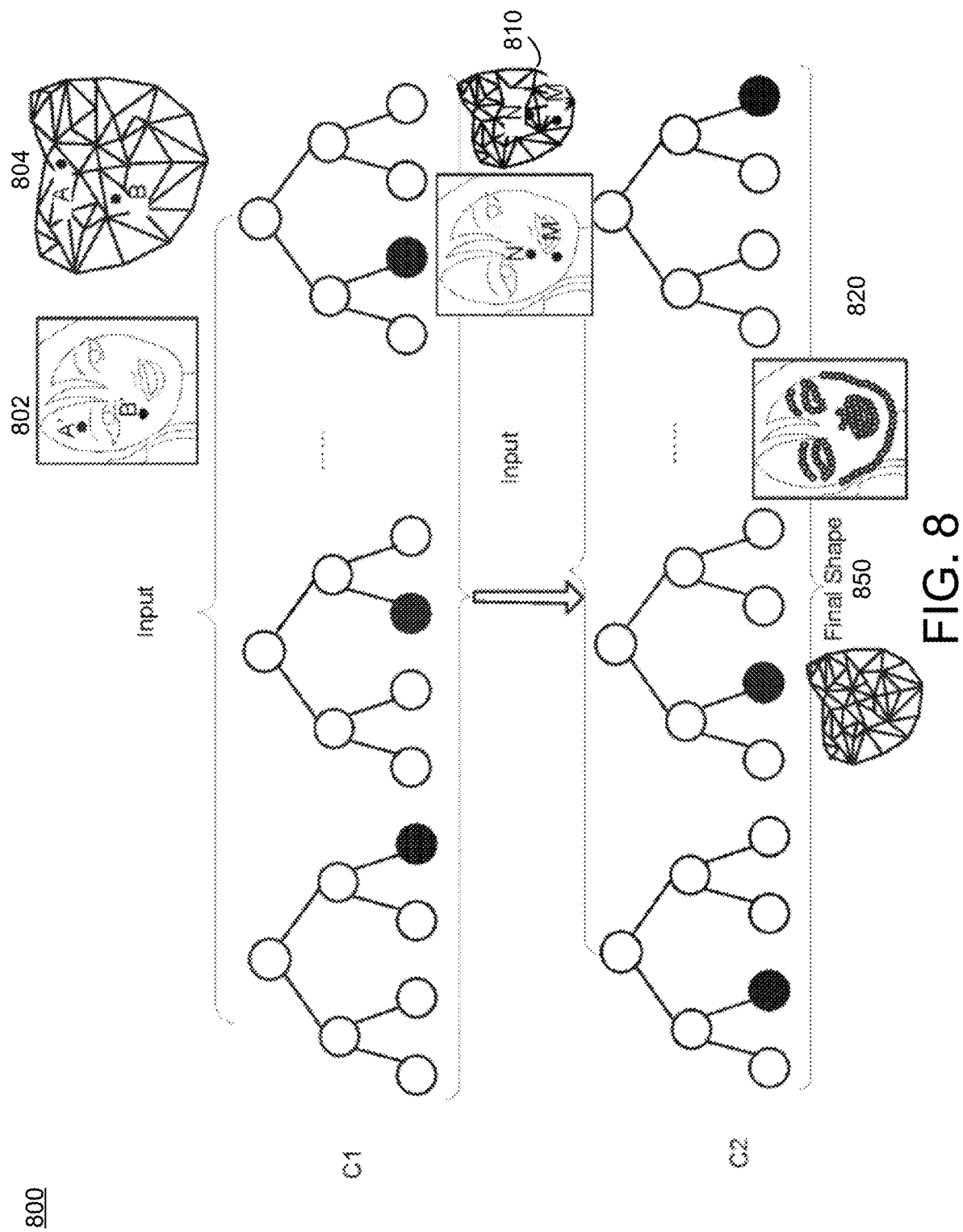
FIG. 8 shows an example of a prediction model based on a cascade of regression trees for obtaining landmarks, in accordance with an embodiment.

Referring to FIG. 8, illustrated is an example of a prediction model based on a cascade 800 of regression trees for obtaining landmarks, in accordance with an embodiment. In some embodiments, a prediction model may be generated by a cascade of regression trees of the landmark detector 310 shown in FIG. 3. As shown in the example of FIG. 8, the cascade 800 has 2 levels (C1, and C2) and multiple trees for each level. In this example, each tree has 2 depths. In other embodiments, a larger number of trees may be included at each level, where each tree may have a greater depth, and additional cascade levels may be included.

An input for level C1 may have a face image 802 and a default mesh model 804. Each tree of level C1 may traverse the decision tree. For example, a node of the first tree may use two positions A and B in the mesh model 804 to determine two pixels. Each tree may generate an adjustment vector at a leaf marked in black color. A first overall adjustment vector for level C1 may be generated by averaging adjustment vectors from all the trees in the level C1. The level C1 of the cascade 800 may generate an adjusted mesh model 810 via applying the adjustment vectors to the landmarks of the default mesh model 804 input to level C1.

An input for level C2 may have the face image 802 and the adjusted mesh model 810. Each tree in C2 can specify positions for comparison to traverse the trees of level C2. For example, one node may specify two positions N and M corresponding to pixels N' and M'. In one embodiment, a maximum distance between positions for a node can decrease from one level of the cascade to the next. For example, the distance between N' and M' in level C2 is shorter (closer together) than a distance between A' and B' in the level C1. In an example traversal of level C2, each tree in the level C2 may generate an adjustment vector at a leaf marked in black color. A second overall adjustment vector may be generated by averaging adjustment vectors from all the trees in the level C2. The level C2 of the cascade 800 may generate a mesh model 850 via applying the adjustment vectors to the landmarks of the adjusted mesh model 810 input to level C2.

Figure 9:
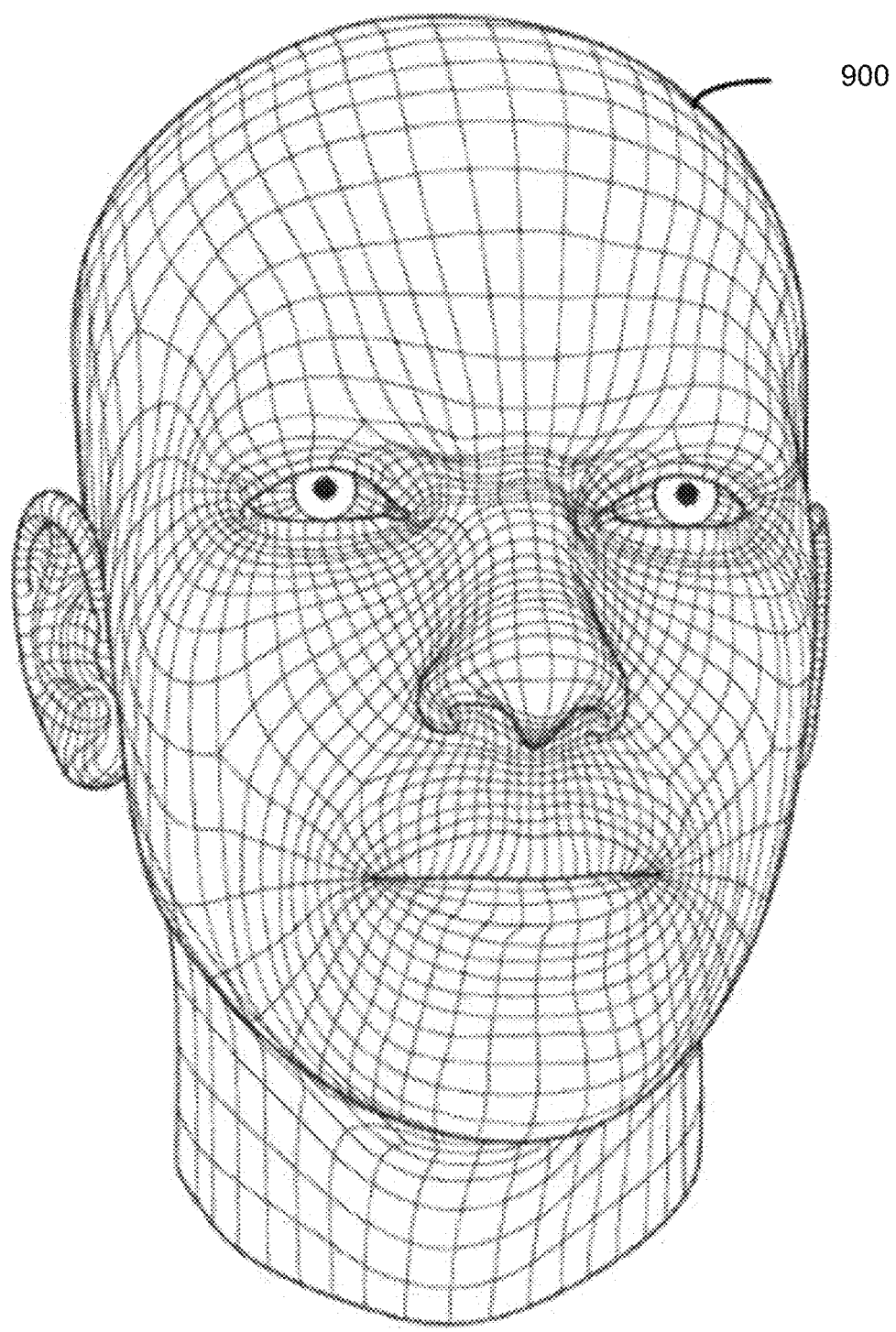
FIG. 9 shows an example default 3D mesh model of an avatar, according to an example implementation of the present disclosure.

Referring to FIG. 9, illustrated is an example default 3D mesh model 900 of an avatar, according to an example implementation of the present disclosure. The default 3D mesh model 900 may be adjusted, modified, or deformed according to blendshapes with corresponding weights. For example, an eye brow may be lowered or a cheek may be lifted (to a certain extent each) according to blendshapes with corresponding weights. Moreover, the 3D mesh model 900 may be further deformed or modified according to visemes in sync with audio stream. Specifically, lips or a nose may for instance be deformed, modified or replaced by a shape or structure provided by a viseme such that the 3D mesh model 900 appears to produce a vocal output in sync.

Figure 10:
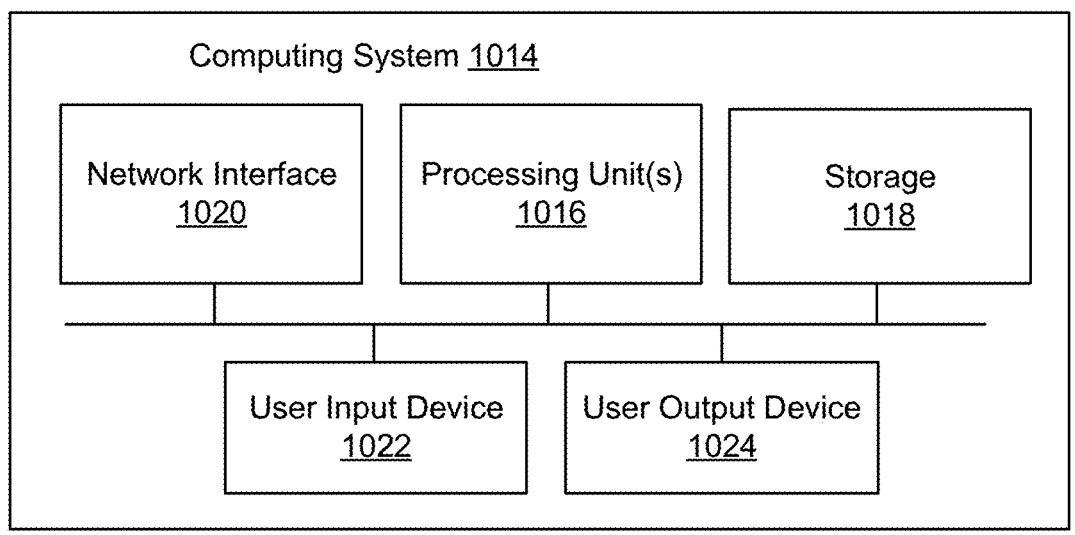
FIG. 10 is a block diagram of a computing environment according to an example implementation of the present disclosure.

Various operations described herein can be implemented on computer systems. FIG. 10 shows a block diagram of a representative computing system 1014 usable to implement the present disclosure. In some embodiments, the client device 110 or the server 140 of FIG. 1 is implemented by the computing system 1014. Computing system 1014 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 1014 can be implemented to provide VR, AR, MR experience. In some embodiments, the computing system 1014 can include conventional computer components such as processors 1016, storage device 1018, network interface 1020, user input device 1022, and user output device 1024.

Network interface 1020 can provide a connection to a wide area network (e.g., the Internet) to which WAN interface of a remote server system is also connected. Network interface 1020 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 1022 can include any device (or devices) via which a user can provide signals to computing system 1014; computing system 1014 can interpret the signals as indicative of particular user requests or information. User input device 1022 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 1024 can include any device via which computing system 1014 can provide information to a user. For example, user output device 1024 can include a display to display images generated by or delivered to computing system 1014. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 1024 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 1016 can provide various functionality for computing system 1014, including any of the functionality described herein as being performed by a server or client, or other functionality associated with message management services.

It will be appreciated that computing system 1014 is illustrative and that variations and modifications are possible. Computer systems used in connection with the present disclosure can have other capabilities not specifically described here. Further, while computing system 1014 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of" 'A' and 13' can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   receiving, by one or more processors through a microphone, a vocal output of a person over a plurality of time instances, as an audio stream;
   acquiring, by the one or more processors through an imaging device, images of facial expressions of the person over the plurality of time instances, as corresponding image data;
   predicting, by the one or more processors, phonemes of the vocal output according to the audio stream;
   translating, by the one or more processors, the predicted phonemes of the vocal output into visemes;
   determining, by the one or more processors, a plurality of blendshapes and corresponding weights, according to the corresponding image data, to form a three-dimensional (3D) model of an avatar of the person incorporating the facial expressions of the person, the plurality of blendshapes comprising 3D structures, the corresponding weights indicating an amount of transformation applied to the 3D structures of the 3D model of the avatar;
   combining, by the one or more processors, the visemes with the 3D model of the avatar to form a 3D representation of the avatar, by synchronizing the visemes with the 3D model of the avatar over the plurality of time instances; and
   rendering, by the one or more processors, the 3D representation of the avatar with the incorporated facial expressions of the person in synchronization with rendering of the audio stream.

2. The method of claim 1, wherein predicting the phonemes of the vocal output comprises determining, by the one or more processors, probabilities of the phonemes of the vocal output according to the audio stream.

3. The method of claim 1, comprising determining, by the one or more processors, the plurality of blendshapes and corresponding weights according to a facial action coding system.

4. The method of claim 1, comprising determining the corresponding weights by:
   determining, by the one or more processors, a base set of landmarks of a face of the person from the corresponding image data;
   determining, by the one or more processors, a first set of weights;
   determining, by the one or more processors, a first candidate set of landmarks using a 3D model of the face formed according to the first set of weights;
   comparing, by the one or more processors, the base set of landmarks and the first candidate set of landmarks; and
   determining, by the one or more processors, a second set of weights that results in a second candidate set of landmarks, and a difference between the second candidate set of landmarks and the base set of landmarks that is less than a difference between the first candidate set of landmarks and the base set of landmarks.

5. The method of claim 1, comprising generating the 3D model of the avatar by combining, by the one or more processors, the plurality of blendshapes according to the corresponding weights.

6. The method of claim 5, wherein combining the visemes with the 3D model of the avatar includes morphing or replacing, by the one or more processors, at least a portion of a mouth of the 3D model corresponding to a first time instance, according to one of the visemes corresponding to the first time instance.

7. A system comprising:
   a microphone;
   an imaging device;
   one or more processors coupled to the microphone and the imaging device; and
   a non-transitory computer readable medium storing instructions when executed by the one or more processors cause the one or more processors to:
     receive, through the microphone, a vocal output of a person over a plurality of time instances, as an audio stream;
     acquire, through the imaging device, images of facial expressions of the person over the plurality of time instances, as corresponding image data;
     predict phonemes of the vocal output according to the audio stream;
     translate the predicted phonemes of the vocal output into visemes;
     determine a plurality of blendshapes and corresponding weights, according to the corresponding image data of the face, to form a three-dimensional (3D) model of an avatar of the person incorporating the facial expressions of the person, the plurality of blendshapes comprising 3D structures, the corresponding weights indicating an amount of transformation applied to the 3D structures of the 3D model of the avatar;
     combine the visemes with the 3D model of the avatar to form a 3D representation of the avatar, by synchronizing the visemes with the 3D model of the avatar over the plurality of time instances; and
     render the 3D representation of the avatar with the incorporated facial expressions of the person in synchronization with rendering of the audio stream.

8. The system of claim 7, wherein the one or more processors predict the phonemes of the vocal output by determining probabilities of the phonemes of the vocal output according to the audio stream.

9. The system of claim 7, wherein the one or more processors determine the plurality of blendshapes and corresponding weights according to a facial action coding system.

10. The system of claim 7, wherein the one or more processors determine the corresponding weights by:
   determining a base set of landmarks of a face of the person from the corresponding image data;
   determining a first set of weights;
   determining a first candidate set of landmarks using a 3D model of the face formed according to the first set of weights;
   comparing the base set of landmarks and the first candidate set of landmarks; and
   determining a second set of weights that results in a second candidate set of landmarks, and a difference between the second candidate set of landmarks and the base set of landmarks that is less than a difference between the first candidate set of landmarks and the base set of landmarks.

11. The system of claim 7, wherein the one or more processors generate the 3D model of the avatar by combining the plurality of blendshapes according to the corresponding weights.

12. The system of claim 11, wherein the one or more processors combine the visemes with the 3D model of the avatar by morphing or replacing at least a portion of a mouth of the 3D model corresponding to a first time instance, according to one of the visemes corresponding to the first time instance.

13. A non-transitory computer readable medium storing instructions when executed by one or more processors cause the one or more processors to:
   receive, through a microphone, a vocal output of a person over a plurality of time instances, as an audio stream;
   acquire, through an imaging device, images of facial expressions of the person over the plurality of time instances, as corresponding image data;
   predict phonemes of the vocal output according to the audio stream;
   translate the predicted phonemes of the vocal output into visemes;
   determine a plurality of blendshapes and corresponding weights, according to the corresponding image data of the face, to form a three-dimensional (3D) model of an avatar of the person incorporating the facial expressions of the person, the plurality of blendshapes comprising 3D structures, the corresponding weights indicating an amount of transformation applied to the 3D structures of the 3D model of the avatar;
   combine the visemes with the 3D model of the avatar to form a 3D representation of the avatar, by synchronizing the visemes with the 3D model of the avatar over the plurality of time instances; and
   render the 3D representation of the avatar with the incorporated facial expressions of the person in synchronization with rendering of the audio stream.

14. The non-transitory computer readable medium of claim 13, wherein the instructions that cause the one or more processors to predict the phonemes of the vocal output further comprise instructions when executed by the one or more processors cause the one or more processors to determine probabilities of the phonemes of the vocal output according to the audio stream.

15. The non-transitory computer readable medium of claim 13, further comprising instructions when executed by the one or more processors cause the one or more processors to determine the plurality of blendshapes and corresponding weights according to a facial action coding system.

16. The non-transitory computer readable medium of claim 13, wherein the instructions that cause the one or more processors to determine the corresponding weights further comprise instructions when executed by the one or more processors cause the one or more processors to:
   determine a base set of landmarks of a face of the person from the corresponding image data;
   determine a first set of weights;
   determine a first candidate set of landmarks using a 3D model of the face formed according to the first set of weights;
   compare the base set of landmarks and the first candidate set of landmarks; and
   determine a second set of weights that results in a second candidate set of landmarks, and a difference between the second candidate set of landmarks and the base set of landmarks that is less than a difference between the first candidate set of landmarks and the base set of landmarks.

* * * * *